Patented Sept. 11, 1945

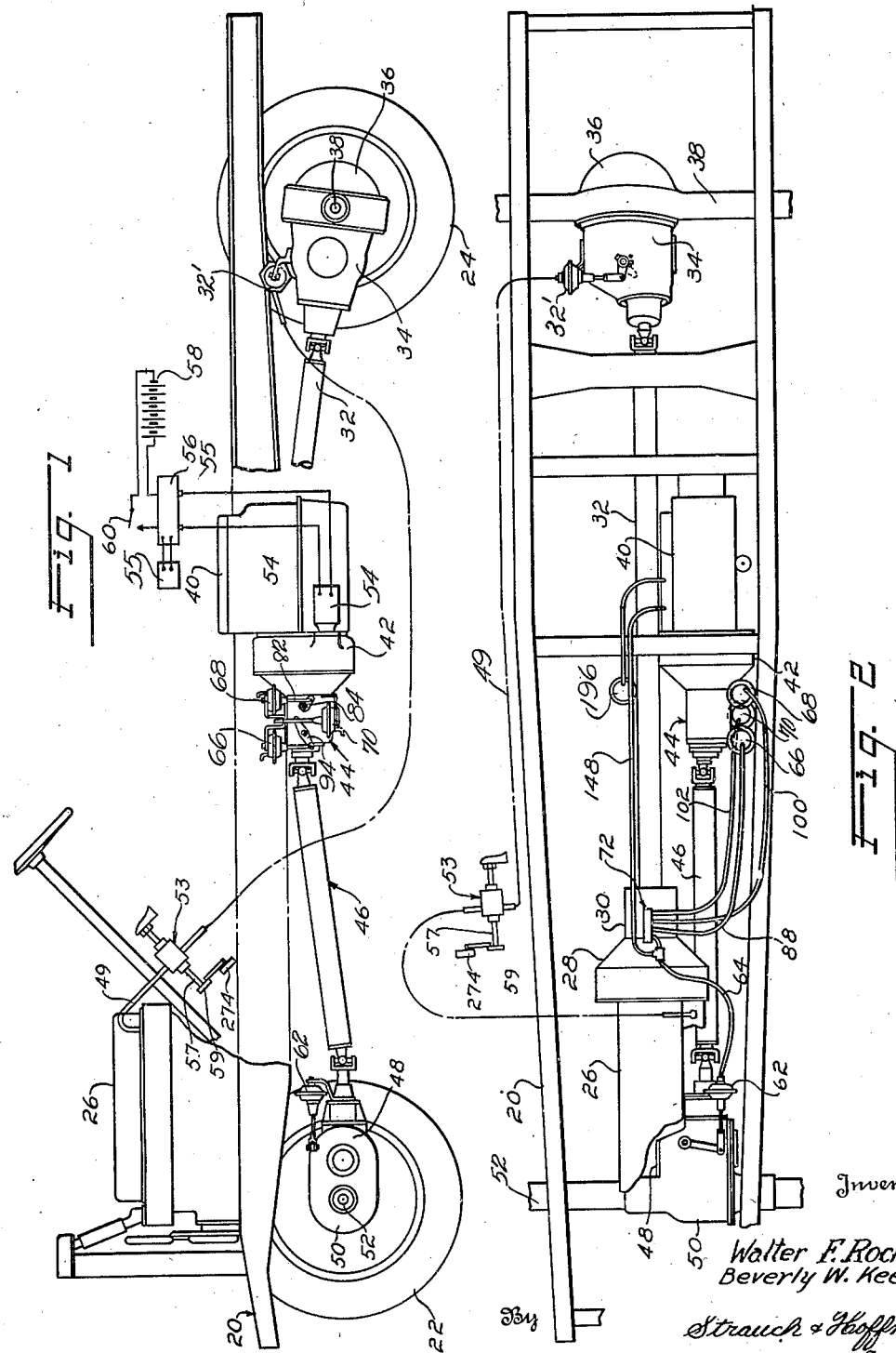

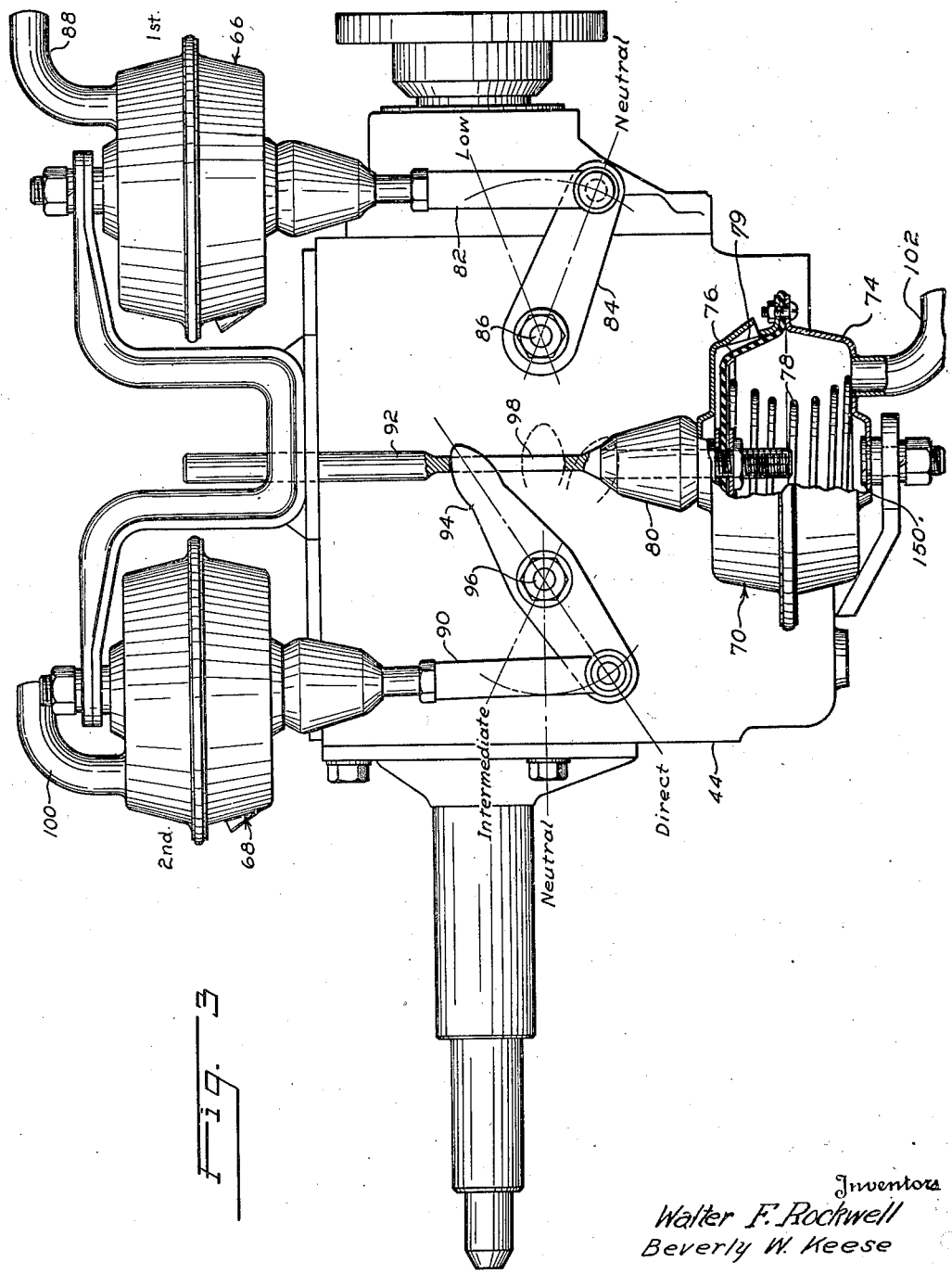

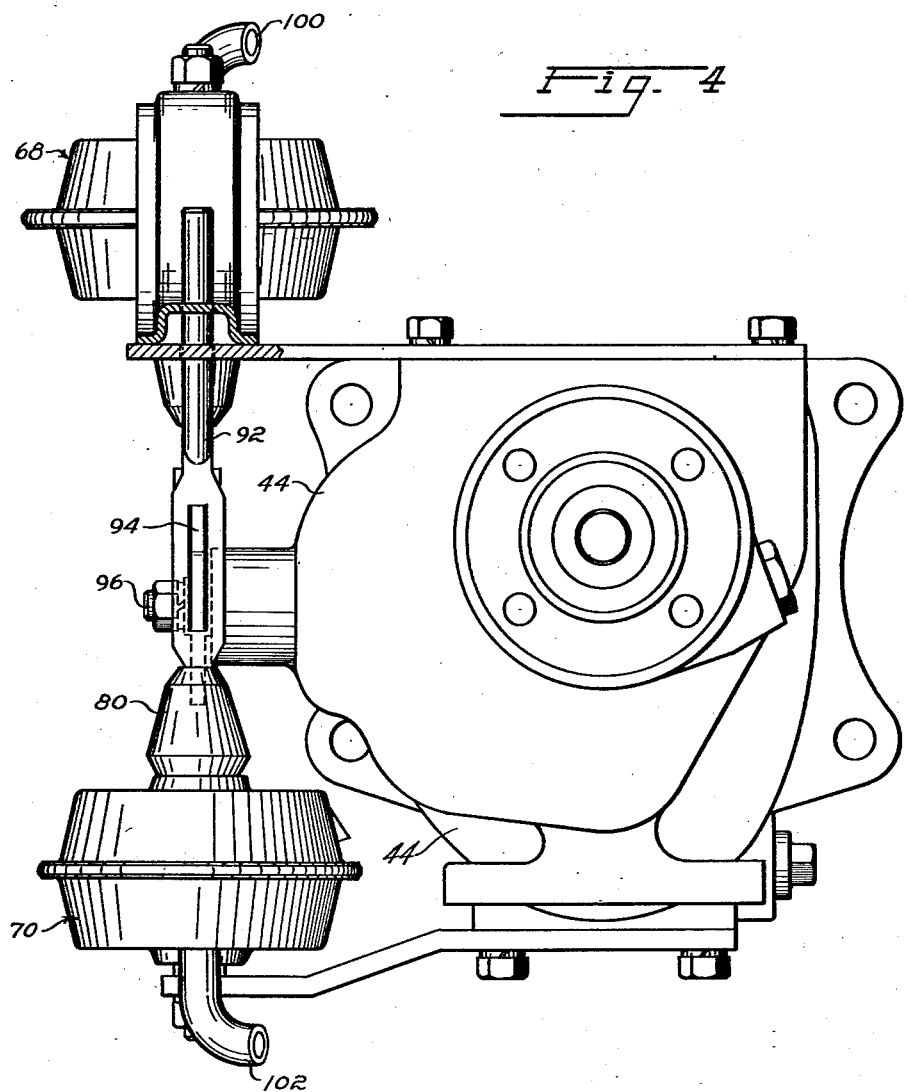

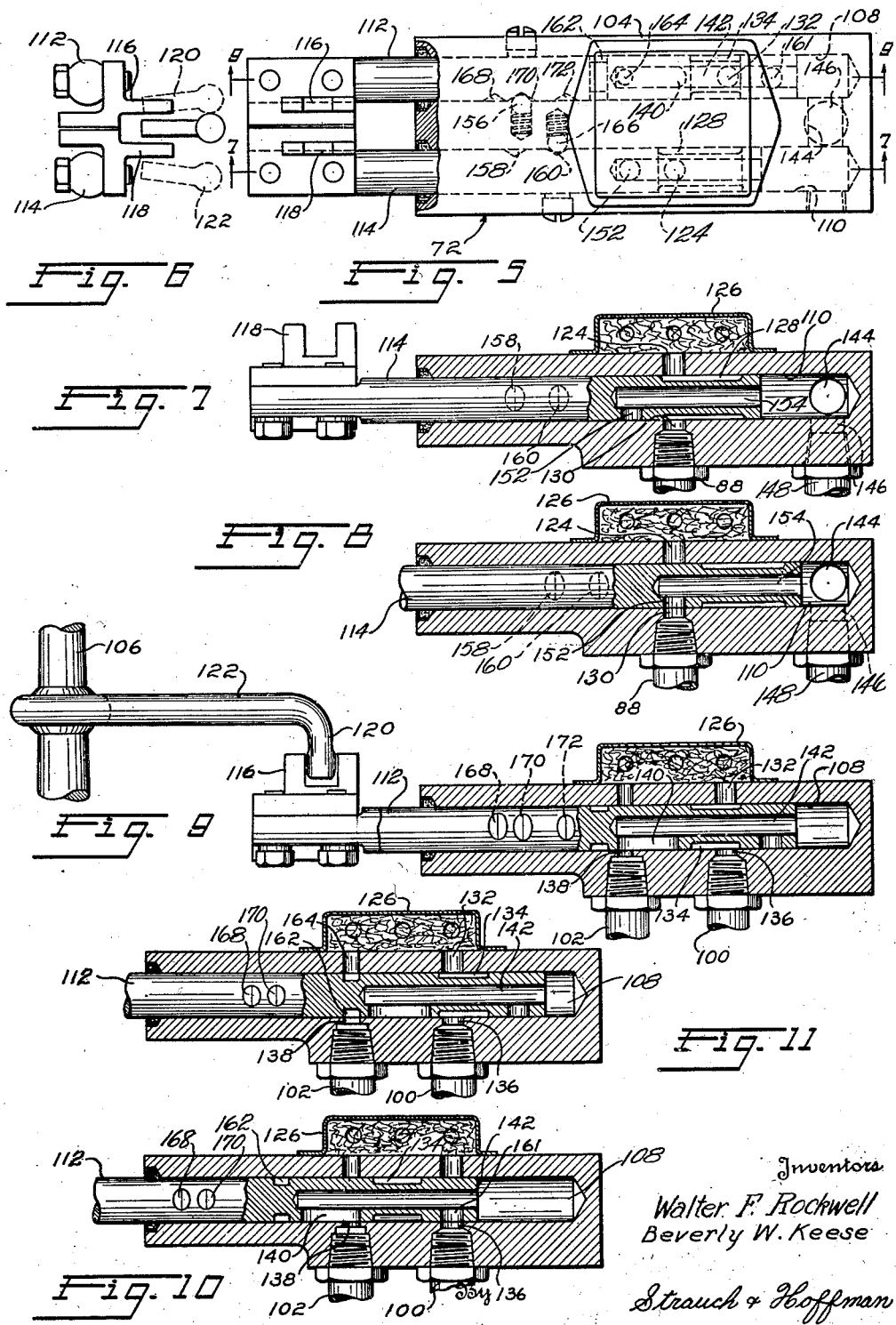

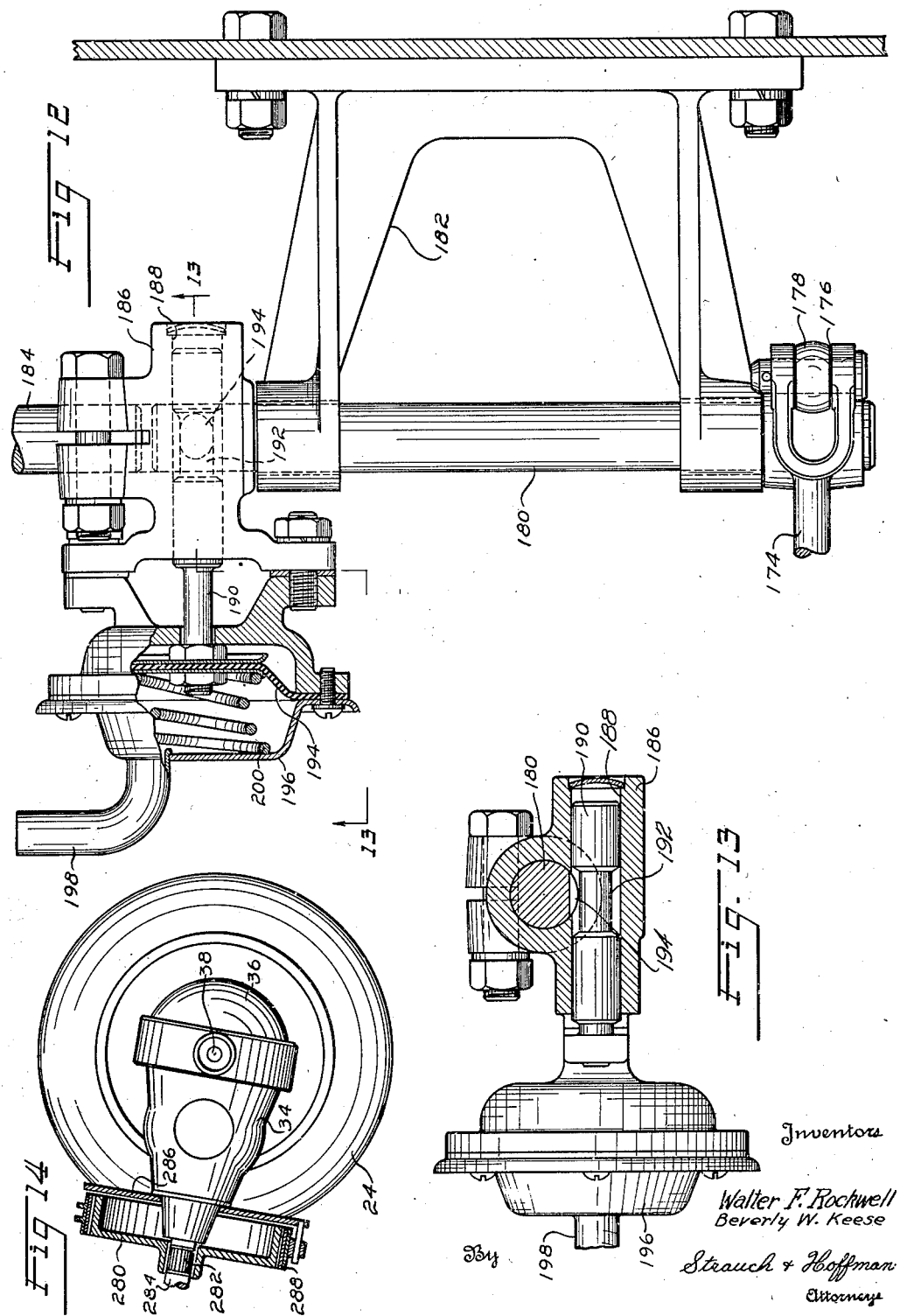

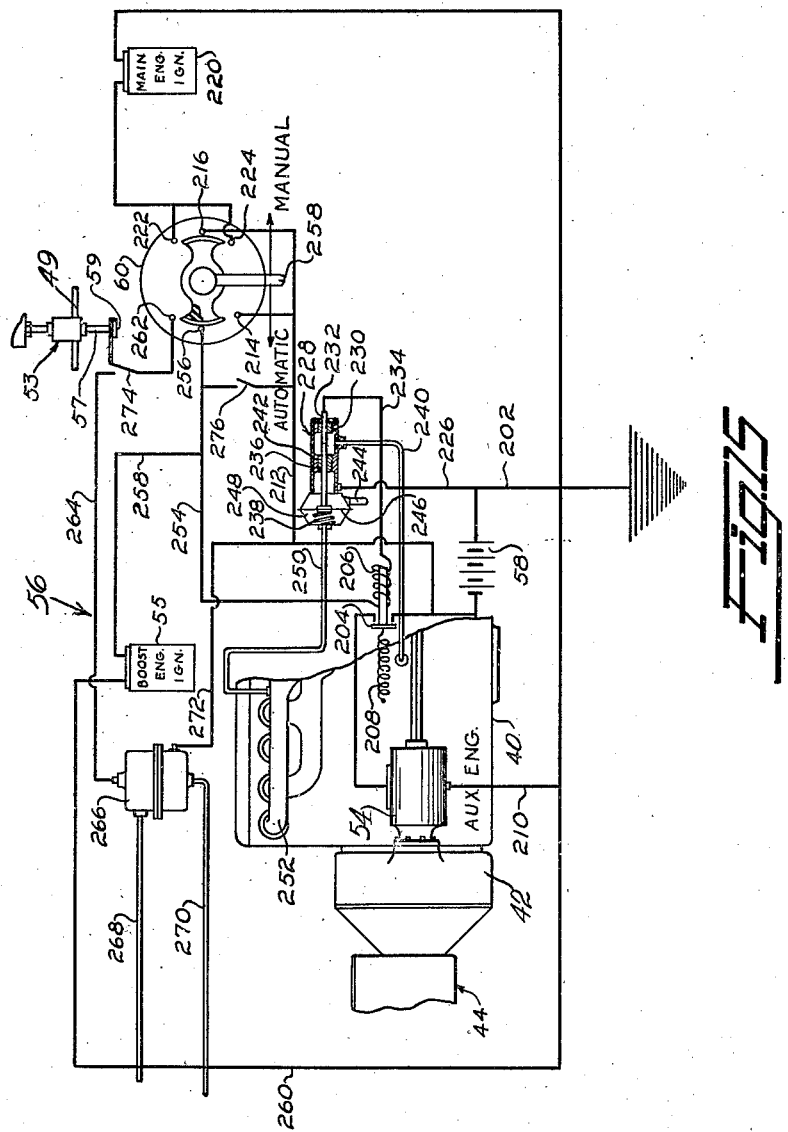

2,384,782

UNITED STATES PATENT OFFICE 2,384,782

AUTOMOTIVE VEHICLE

Walter F. Rockwell, Detroit, Mich., and Beverly W. Keese, Oshkosh, Wis., assignors to The Timken-Detroit Axle Company, Detroit, Mich., a corporation of Ohio Application March 23, 1944, Serial No. 527,782

20 Claims. (Cl. 180—54)

This invention relates to improvements in automotive vehicles and has particular reference to a heavy duty automotive vehicle having a main engine furnishing the power under most operating conditions and a booster or auxiliary engine for furnishing supplementary power at times when the power of the main engine is inadequate to maintain a desired vehicle speed and is a continuation-in-part of co-pending application Serial No. 506,582, filed October 16, 1943 and is an improvement over co-pending application Serial No. 356,214, filed September 10, 1940. Co-pending application Serial No. 432,520, filed February 26, 1942, discloses a special development of the same general subject matter.

Various arrangements have been heretofore proposed providing a plurality of motors for driving a vehicle having motors of like or different capacities operating through the same drive lines and designed either for alternative or simultaneous operation without regard to the tractive effort that can be absorbed by the driving wheels. Such vehicles have in general not been practical because of the excessive tire and other wear an dvehicle maintenance expense, inefficiency of operation, difficulty of control on the part of the driver, and other practical disadvantages. The only multiple motor road vehicles that have been heretofore successful to our knowledge are of the type in which separate wheels or axles are driven simultaneously by individual motors in normal operation.

The foregoing problems we have solved by providing main and booster engines driving different wheels through independent drive lines, controlled through a novel control arrangement and having maximum powers insufficient to slip the wheels driven thereby under normal road conditions. In the preferred embodiments of our invention, the booster engine is operative only when the power of the main engine is insufficient to maintain the desired vehicle or tractor and trailer speed under particular conditions. Our invention has been found in long comparative road tests to have material advantages in reduced running time, increased load carrying capacity, improved fuel consumption and non-interference with other traffic on the highways.

In the earlier embodiments of our invention disclosed in said co-pending applications, while providing various important advantages over the prior arrangements, it has been found that the control arrangements used have imposed additional burdens on the drivers of the vehicle which have been accentuated by the increased loads carried and increased speeds permitted. For example, with manual operation required to start the prior booster or auxiliary engines of the prior disclosures, the driver has had to divert his attention to the starting of this engine at times when his attention is otherwise heavily engaged in negotiating grades and curves and attempting to maintain the vehicle speed such that the booster engine may be smoothly coupled into the available power. He has had to watch the speed and the load on the main engine to determine when the use of the auxiliary or booster engine is necessary, has had to use extreme skill and additional physical effort in shifting when the transmissions of the two engines were coupled together by previous mechanical devices, and has experienced difficulty in controlling the increased load on steep grades or at high speeds with previous conventional brake equipment.

It is therefore among the objects of the present invention to provide a heavy duty booster engine vehicle with improved controls and brake equipment effective to relieve the driver of most or all of the excess burden over operating a conventional single engine vehicle of the same general class and to so proportion the loads on the vehicle parts and tires that undue wear and strain will not occur.

A further object resides in the provision, in a vehicle of the character indicated, of a novel arrangement of a main engine having a power output capacity based on the traction capacity of the main drive axle or axles of the vehicle and sufficient to normally furnish all of the power for propelling the vehicle, and a booster engine having a power output capacity based on the tractive capacity of another vehicle axle such as a front steer drive axle or trailer axle supplementing the power of the main engine.

A somewhat more specific object resides in the provision of servo controls for the starting, clutching and shifting operations of the booster engine which operate smoothly and substantially automatically and with which substantially no additional skill, attention or physical effort on the part of the driver is required when both engines are operating than when only the main engine is in operation.

A further object resides in the provision of an improved starting control for the booster engine arranged to give the driver a choice between fully automatic and manual starting of the booster engine and to positively prevent the booster engine starter motor being energized while the booster engine is running.

A still further object resides in the provision of improved brake equipment which will enable the driver to hold the increased loads on steep grades without any material increase in physical effort and without damage to the brake equipment.

Other objects and advantages will be more particularly pointed out hereinafter or will become apparent as the description proceeds.

In the accompanying drawings, in which like reference numerals are used to designate similar parts throughout, there is illustrated a suitable mechanical embodiment for the purpose of disclosing the invention. The drawings, however, are for the purpose of illustration only and are not to be taken as limiting or restricting the invention since it will be apparent to those skilled in the art that various changes in the illustrative construction may be resorted to without in any way exceeding the scope of the invention.

In the drawings:

Figure 1 is a side elevational view of the chassis of a vehicle constructed according to the invention, a portion being broken away to further illustrate the construction thereof;

Figure 2 is a top plan view of the vehicle chassis illustrated in Figure 1;

Figure 3 is a side elevational view on an enlarged scale of the auxiliary engine transmission shown in Figures 1 and 2;

Figure 4 is an end elevational view of the auxiliary engine transmission shown in Figure 3;

Figure 5 is a top plan view of a valve actuated by the main engine transmission and controlling the servo devices effective to shift the auxiliary engine transmission;

Figure 6 is an end elevational view of the valve shown in Figure 5 showing in end elevation a valve operating finger on an arm secured to and controlled by the shift device of the main engine transmission;

Figure 7 is a vertical sectional view of a portion of the valve taken along the line 7—7 of Figure 5;

Figure 8 is a sectional view similar to Figure 7 showing a different operative position of the valve;

Figure 9 is a sectional view of the valve shown in Figure 6 taken along the line 9—9 of Figure 5;

Figure 10 is a sectional view similar to Figure 9 showing a different operative position of the valve from that illustrated in Figure 9;

Figure 11 is a vertical sectional view similar to Figure 9 showing a different operative position of the valve from those illustrated in Figures 9 and 10;

Figure 12 is a plan view of mechanism for rendering the auxiliary engine clutch operative by the main clutch pedal when the auxiliary engine is operating;

Figure 13 is a sectional view on the line 13—13 of Figure 12;

Figure 14 is a diagrammatic sectional view of an improved brake arrangement; and Figure 15 is a diagrammatic view of a suitable starting and ignition circuit for the auxiliary engine.

Referring to the drawings in details and particularly to Figures 1 and 2, the numeral 20 generally indicates a vehicle frame supported from front and rear road engaging wheels, as indicated at 22 and 24, by conventional springs, or other suspending means, not illustrated.

Frame 20 carries a main engine 26, connected through a clutch 28, change speed transmission 30, propeller shaft 32, two speed rear axle drive gear 34, differential 36 and rear axle 38 with the rear wheels 24, and also carries a booster engine 40 connected through a clutch 42, change speed transmission 44, propeller shaft 46, disengageable gear drive 48, differential 50 and front axle 52 with the dirigible front wheels 22.

The rear axle two speed drive 34 may be similar to that shown and described in United States Patent No. 2,183,667 issued December 19, 1939 to Lawrence R. Buckendale, and may be shifted by a servo device 32' actuated in one direction by a compression spring, not illustrated, and in the opposite direction by the pressure differential existing between the main engine intake manifold and atmospheric pressure. The connection 49 between the main engine intake manifold and the servo device 32' may lead through a suitable manually actuatable pneumatic valve 53, shown in detail in copending application Serial No. 506,582, filed October 16, 1943, which valve may constitute a portion of the automatic apparatus which controls the starting and stopping of the booster engine. As illustrated, the valve is interposed in the fluid connection 49 between the main engine intake manifold and the rear axle clutch actuator 32' so that it functions to select the rear axle drive gear ratio. This valve is provided with a shaft extension 57 carrying a radial arm 59 connected with a switch 276 which is incorporated in the auxiliary engine starting circuit in a manner illustrated in Figure 15 and which functions to control the starting of the auxiliary engine in a manner hereinafter described.

Although the main engine and booster engine driving connections have common controls, as will later appear, they are drivingly independent of each other and the power output capacity of each engine is based on the traction capacity of the axle to which it is connected. Thus, when the main engine is connected to a dual wheel rear axle, and the booster engine is drivingly connectable to a single wheel front axle carrying approximately one half the load carried by the rear axle, the booster engine might conveniently have a power output capacity approximately one half that of the main engine. The invention is not limited however to any specific ratio of the power output capacities of the two engines, it being important only that the capacities of the engines shall correspond to the available tractive effort of the wheels driven thereby so that the wheels cannot be injuriously slipped in normal operation.

The booster engine may have a starting device as indicated at 54 and suitable ignition apparatus, including coil 55, controlled by a suitable electric circuit indicated at 56 in Figure 1 and diagrammatically illustrated in Figure 15, which will be hereinafter described in detail. This control apparatus may be energized by a battery 58 through a suitable control switch 60 which may be manually operated.

The front axle differential 50 and the disengageable drive gear 48 may be similar to that shown in United States Patent No. 2,309,432, issued January 26, 1943, to H. W. Alden for Motor vehicle, and the drive gear may be engaged by a servo device 62 having a spring which acts to disengage the gear and a connection 64 with the intake manifold of the booster engine, whereby the pressure differential between the booster engine manifold pressure and the atmospheric pressure will overcome this spring when the booster engine is operating and engage the gears thereby completing the drive between the booster engine propeller shaft 46 and the front driving axle 52.

*Description of auxiliary engine transmission shift*

The booster engine transmission 44 is shifted by a set of pneumatic servo devices 66, 68 and 70, particularly illustrated in Figures 3 and 4, under the control of the valve 72 particularly illustrated in Figures 5-11, inclusive.

The three servo units 66, 68 and 70 are similar in construction, which construction is particularly illustrated in connection with the unit 70. This unit comprises a two part metal casing 74 enclosing a transverse diaphragm 76 and a coiled compression spring 78. The diaphragm is connected at its center to an operating shaft 82 which extends through an apertured bushing 80, and a fluid connection 102 leads to the interior of the casing at the end thereof opposite the bushing 80. With this arrangement the compression spring urges the diaphragm and operating rod in one direction and these are moved in the opposite direction when the interior of the casing is subjected on the side connected with the fluid conduit to a fluid pressure less than atmospheric. Openings 79 are provided in the casing on the atmospheric pressure side of the diaphragm.

The servo unit 66, through its operating rod 82, the lever arm 84 and shaft 86, controls the low gear ratio of the auxiliary engine transmission, the spring urging the mechanism to a neutral position and the application of vacuum through the conduit 88 moving the diaphragm against the spring to engage the low speed gear. The intermediate and high speed gear ratios are controlled by the units 68 and 70 through their operating shafts 90 and 92, the lever arm 94 and the shaft 96.

In this arrangement when there is no application of manifold vacuum to either of these units 68 and 70 the spring in unit 68 forces the lever 94 to the position shown in full lines in Figure 3 in which the transmission is in its high speed gear ratio. If manifold vacuum is applied to the unit 68 only, the lever 94 will be turned to the indicated neutral position in which both intermediate and high speed gears are placed in neutral, coming to rest against the bottom of the slot 98 in the rod 92. If vacuum is applied to both of the units 68 and 70 the slot 98 will be moved downwardly by the unit 70 and the lever 94 will be turned by the unit 68 to the indicated intermediate speed position. Application of vacuum to the unit 68 is effective to move lever 94 from direct drive to neutral when further movement is limited by the bottom of the slot in rod 92 and also to move lever 94 from its neutral to its intermediate speed position when the stop constituted by the upper position of rod 92 is removed. Unit 70 moves the rod 92 and slot 98 downwardly to remove the stop at neutral for the lever 94 so that the intermediate speed may be engaged by the application of vacuum to unit 68.

The manifold vacuum is applied to the unit 68 through the conduit 100 and to the unit 70 through the conduit 102.

Application of atmospheric and manifold pressure to the diaphragms of the servo units is controlled by the valve, generally indicated at 72 and particularly illustrated in Figures 5-11, inclusive. This valve comprises casing 104 adapted to be mounted on the vehicle adjacent to the main engine transmission shift lever, a fragment of which is shown in Figure 9 and indicated by the numeral 106. The casing has a pair of parallel bores 108 and 110 within which are slidably mounted respective valve plungers 112 and 114. These plungers project at one end outside of the casing and carry on their projecting ends respective gates or lugs 116 and 118 engageable by finger 120 formed on the end of bracket arm 122 welded or otherwise firmly secured on gear shift lever 106.

When the main transmission is in neutral, plunger 114 will occupy the position in bore 110 illustrated in Figure 7 in which position port 124, connected with the atmosphere through the filter 126, is connected through annular reduction 128 on the valve stem and port 130 with conduit 88 leading to servo unit 66, thus permitting the spring in unit 66 to maintain the auxiliary transmission low speed gear train in neutral. Plunger 112, at the same time, occupies the position in bore 108 illustrated in Figure 9, in which position conduit 100 leading to servo unit 68 is connected with the atmosphere through filter 126, port 132, annular groove 134 on valve stem 112 and port 136 thus permitting the spring in unit 68 to urge lever 94 in an anticlockwise direction, as viewed in Figure 3, toward the third or direct speed drive of the auxiliary transmission. At the same time, however, conduit 102 leading to servo unit 70 is connected through hole 138, elongated port 140 in valve stem 112, axial bore 142 in the valve stem, the end of bore 108, branch channel 144 leading into the end of bore 108, hole 146 and conduit 148 with the interior of the intake manifold of the booster engine.

If the booster engine is operating, the pressure differential exerted on diaphragm 76 will pull the diaphragm downwardly, as viewed in Figure 3, until the end of rod 92 within the unit strikes abutment 150 stopping rod 92 in a position in which the upper end of slot 98 holds lever 94 in its neutral position in which neither the high nor intermediate speed ratios of the auxiliary transmission can be engaged. If there is no vacuum in the booster engine intake manifold, spring 78 will move shaft 92 upwardly permitting lever 94 to swing until the direct speed drive of the auxiliary transmission is engaged, which is the normal condition of this transmission when the booster engine is not operating. At the same time the booster engine will be disengaged from its associated driving axle by servo unit 62, as described above.

When the main transmission is moved to the low or creeper speed position, plunger 112 does not move out of its neutral position but plunger 114 is moved outwardly with respect to bore 110. Annular groove 128 however is of sufficient length to keep conduit 88 connected with the atmosphere so that the low auxiliary transmission speed remains in neutral and, if the booster engine is operating, the high and intermediate speed gear trains also remain in neutral, so that the booster engine is not drivingly connected with its associated axle when the main transmission is in low or creeper gear ratio.

When the main transmission is shifted to second speed plunger 112 remains in the neutral position with the effect described above, but plunger 114 is moved inwardly relative to bore 110 to the position particularly illustrated in Figure 8 in which conduit 88 is connected through port 130, hole 152, axial bore 154 in plunger 114, branch channel 144, hole 146 and conduit 148 with the booster engine intake manifold, port 124 leading to the atmosphere through filter 126 being cut off. Now, if the booster engine is operating, the application of the manifold vacuum to unit 66 will swing arm 84 and rotate shaft 86 to engage the low speed drive gear of the auxiliary engine transmission, front axle drive gear 48 being engaged by unit 62 and the booster engine will assist in driving the vehicle through its low speed drive gear ratio corresponding to the second speed drive gear ratio of the main transmission.

It is thus seen that plunger 114 has only two operative positions which positions are determined by engagement of spring pressed detent 166 with one or the other of notches 158 and 160 provided in plunger 114.

If now the main engine transmission is shifted from its second to its third speed gear ratio, passing of shift lever 106 through neutral will cause finger 120 to return plunger 114 to its neutral position and engage in lug 116 of plunger 112 and movement of the lever to place the main transmission in the third speed gear ratio will move plunger 112 to the position particularly illustrated in Figure 10.

In the position particularly illustrated in Figure 10 conduit 100 is connected with the booster engine intake manifold through hole 136, port 161 and bore 142 while, at the same time, conduit 102 will be connected with the booster engine intake manifold through hole 138, elongated port 140 and bore 142 through branch channel 144, hole 146 and conduit 148. With this position of valve plunger 112, manifold vacuum will be applied to both units 68 and 70 moving rod 90 upwardly and rod 92 downwardly, as viewed in Figure 3, and swinging lever 94 to the indicated intermediate speed position.

When the gear shift lever is moved to place the main transmission in its high or direct speed drive, plunger 112 will be moved to the position illustrated in Figure 11. In this position of the plunger conduit 100 is connected with the atmosphere through hole 136, annular groove 134, hole 132 and filter 126. At the same time, conduit 102 will be connected with the atmosphere through hole 138, annular groove 162, hole 164 and filter 126 thus connecting both of the units 68 and 70 with the atmosphere and permitting the compression springs therein to respectively move rod 90 downwardly and rod 92 upwardly, thereby tilting lever 94 to the indicated direct drive position for the auxiliary transmission.

Return of the gear shift lever to neutral will place the plungers in the locations shown in Figures 7 and 9 respectively and place all of the auxiliary transmission gear drives in neutral when the booster engine is operating, as explained above.

Plunger 112 thus has three positions in which it is steadied by spring pressed detent 156 engaging in one or the other of notches 168, 170 and 172.

Description of auxiliary engine clutch control mechanism

The main engine clutch 28 may be operated by a suitable foot pedal, not illustrated, in the conventional manner. In order to obtain operation of the booster engine clutch 42, link 174 may be connected to the clutch pedal and extended rearwardly of the vehicle to a pivotal connection 176 with the free end of a lever 178 secured at its opposite end to a torque shaft 180 rotatably mounted in a suitable bracket 182 rigidly secured to the vehicle. Torque shaft 180 extends through bearings carried by bracket 182 toward the booster engine clutch 42 and a second torque shaft 184, which operates the booster engine clutch, extends into abutting relationship with the adjacent end of torque shaft 180 and is coaxial therewith. A bracket member 186 is clamped upon the end of shaft 184 and rotatably receives the end of shaft 180 and is provided with a bore 188 extending transversely of shaft 180 within which is a slidable plunger or drop pin 190. Pin 190 is provided with an annular groove 192 intermediate its length, and shaft 180 is provided with a notch 194, the groove and notch being so arranged that, when the groove of the plunger is centered over the shaft 180, the shaft may rotate freely in bracket 186 but, when the plunger is moved to bring a portion thereof beyond the annular groove in line with shaft 180, the shaft will be locked relative to bracket 186 and rotational movements of shaft 180 will be transmitted to shaft 184 so that operation of the main engine clutch will simultaneously operate the auxiliary engine clutch. This arrangement constitutes a simple, automatically actuated drop pin construction for operatively connecting the two clutches together when the booster engine is operating.

Plunger 190 is connected at one end to the center of diaphragm 194 peripherally clamped in a housing 196 the interior of which is connected through conduit 198 with the booster engine intake manifold. Normally plunger 190 is held in position to release the shaft 180 by coiled compression spring 200, but, when the booster engine is operating, the effect of the intake manifold vacuum overcomes the force of spring 200 and moves plunger 190 into position to interlock shafts 180 and 184.

Operation of the auxiliary engine transmission shifting mechanism and clutch control From the above description it will be apparent that, when the booster engine is not operating, the auxiliary engine clutch will not be operated and the auxiliary engine transmission will remain in its direct speed drive gear ratio, while the booster engine propeller shaft will be drivingly disconnected from the associated driving axle. When the booster engine is operating, the booster engine clutch will be connected with the main engine clutch so that both clutches will be operated simultaneously and the servo shifting means for the booster engine transmission will be connected with the main engine transmission in such a manner that whenever the main engine transmission is in neutral or in its lowest speed drive gear the booster engine transmission will be in neutral, but, when the main engine transmission is placed in either its second, third or fourth speed drive, the booster engine transmission will be simultaneously placed in its corresponding low, intermediate or high speed drive and the booster engine propeller shaft will be drivingly connected with the associated driving axle.

Description of improved brake installation

The arrangement shown in Figure 14 illustrates an improved brake which has been found desirable for certain installations, particularly where it is necessary to hold a heavy load on a steep grad. This brake is preferably added in addition to the conventional wheel brakes of the vehicle but, in some installations, might be substituted for the rear wheel brakes.

In this arrangement a brake drum 280 is mounted by a suitable spline connection 282 on the power shaft 284 which projects from the rear axle housing 34 and is connected with the main engine propeller shaft 32 through a suitable universal joint. An anchor plate 286 is rigidly mounted on the housing and carries a suitable external brake band or shoe 288 moved into engagement with the drum 280 by suitable conventional means, not illustrated.

With this arrangement the conventional gear reduction between the rear driving axle 38 and the shaft 284 through the ring and pinion gear and through the two speed drive gears can be used to advantage in reducing the actual torque imposed on the brake so that the frictional resistance of the brake is greatly multiplied as it is applied to the road wheels 24 thus permitting a magnified braking effort with a minimum of heat dissipated by the brake and with a break mechanism of reasonable size and weight.

*Description of improved starting and ignition circuits for the auxiliary engine*

A suitable starting and ignition circuit for the booster engine is diagrammatically illustrated in Figure 15. It is to be understood, however, that the invention is not limited to this particular circuit but either a fully automatic circuit or a manual circuit may be utilized if desired instead of the combined manual and automatic circuit illustrated.

In the circuit illustrated, the battery 58 is grounded at one side, as indicated at 202, and is connected at its opposite side to a starter switch 204 closed by solenoid 206 and opened by spring 208. The switch 204 when closed acts to connect the starter motor 54 directly with the battery 58, the starter motor being suitably grounded to the vehicle frame as indicated by the ground lead 210. An electrical conductor 212 leads from the live or ungrounded side of battery 58 to contact points 214 and 216 in a switch 60, which may conveniently be the master ignition switch of the vehicle. This switch has two operational positions, as indicated by the arrows labelled "automatic" and "manual," and has a third inoperative position, illustrated in full lines in Figure 15, in which the ignition circuits of both engines are interrupted. The main engine ignition circuit including the ignition coil 220 is connected to the switch 60 by two terminals 222 and 224 disposed one at each side of the battery terminal 216 so that the main engine ignition circuit will be completed in either the booster engine manual or automatic position of the switch.

One end of the booster engine starter solenoid 206 is connected with the ground connection 226 through a switch, generally indicated at 228. This switch may be of the low voltage oil damped switch type and comprises, in general, a casing 230 within one end of which is mounted a fixed contact member 232 insulated from the casing and connected with the solenoid 206 by the conductor 234, and a movable contact 236 electrically connected with the casing by a compression spring 238, the casing being suitably grounded by the ground connection 226. An oil pressure conduit 240 leads from the output side of the auxiliary engine lubricating oil pump to a chamber in the casing 230 in which the contacting ends of the members 232 and 236 are located, one end of this chamber being constituted by the end of the casing supporting the contact member 232 and the other end being constituted by a partition 242 providing a bearing for the movable contact member 236. A slight clearance is preferably provided between the member 236 and the bearing 242 so that a small quantity of oil can flow from the conduit 240 out of the chamber and through a different part of the casing to the oil return conduit 244 in order to replace cold oil in the chamber with warm oil from the engine to improve the operation of the switch. If it is desired to combine the manifold pressure operated switch function with the oil pressure operated switch, the end of the member 236 opposite the contact member 232 may be connected to a diaphragm 246 in a pneumatic chamber 248 connected through a conduit 250 with the intake manifold 252 of the booster engine 42. Otherwise a separate manifold pressure switch may be provided, connected in series with the oil pressure controlled switch.

When the booster engine is not operating, the compression spring 238 will move the member 236 into contact with the member 232 thereby completing the ground connection of the solenoid 206. As soon, however, as the auxiliary engine starts, the partial vacuum in the manifold 252 acting on the diaphragm 246 moves the member 236 away from the member 232 thus interrupting the solenoid circuit and preventing closing of the starting switch 204 while the booster engine manifold vacuum remains above a predetermined value. As soon as the booster engine builds up lubricating oil pressure this pressure applied to the end of the member 236 also acts to keep member 236 out of contact with the member 232 and prevents closing of the starter switch in the event the manifold vacuum of the booster engine should temporarily decrease while the engine is operating.

The end of the starter switch solenoid 206 opposite to the end connected to the switch 228 is connected through a conductor 254 with a terminal 256 of the switch 60.

If manual operation of the booster engine is desired, the lever 258 of the ignition switch 60 may be moved in the direction of the arrow labelled "manual" which will connect the contact 214 with the contact 256 energizing the solenoid 206 to operate the starter 54 and this circuit will be broken by the switch 228 as soon as the booster engine is started. At the same time the booster engine ignition circuit including the coil 55 will be energized from the terminal 256 through the conductor 258 and a suitable ground connection indicated at 260.

If automatic operation of the booster engine is desired, the lever 258 will be moved in the direction of the arrow labelled "automatic" which will connect the terminal 256 with the terminal 262 which terminal is connected through a conductor 264 with one contact of a control unit 266. This unit is connected through a pair of pneumatic conduits 268 and 270 with the space ahead of and with the throat of a Venturi tube interposed between the main engine carburetor and the main engine intake manifold, all as particularly illustrated and described in our co-pending application Serial No. 506,582, filed October 16, 1943. From another terminal of control unit 266 a conductor 272 leads to the battery line 212 so that, when the switch 60 connects the terminals 256 with the terminal 262, the starting circuit and ignition circuit of the auxiliary engine is connected to the battery 58 through the automatic control unit 266 which is so arranged that the booster engine will be started only when the speed and load factors of the main engine reach certain predetermined conditions. With the automatic circuit in operation the switch 228 will still act to disable the starter of the booster engine and maintain the starter against operation as long as the booster engine is operating, in the manner described above.

Preferably a switch 274 is included in the conductor 264 and this switch may be operated by valve 53 which controls the ratio selection of the two speed rear axle in a manner such that the switch is closed only when the rear axle of the vehicle is in its low speed ratio thus limiting automatic operation of the auxiliary engine to those occasions when the lower speed ratio of the two speed rear axle is being utilized.

This switch may be provided with a manually operated lockout of some form known to the art so that, when desired, the main engine may be operated and the booster engine maintained inoperative by operating the main engine on the "automatic" controls and maintaining the switch 274 open. If desired, a second switch 276 may be installed between the conductors 212 and 254 in order that the auxiliary engine may be manually operated without use of the master ignition switch 60. This would permit operation of the auxiliary engine for testing and other purposes without the necessity of completing the ignition circuit of the main engine.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle having two independent drive axles, a main engine drivingly connectible with one of said axles; a booster engine drivingly connectible with the other of said axles; a driving connection including manually controlled elements between said main engine and said one axle; a controllable driving connection between said booster engine and said other axle; and means rendered operative by operation of said booster engine to enable said manually controlled elements to control the driving connection between said booster engine and said other axle.

2. In a heavy duty automotive vehicle having a rear drive axle and a front steering drive axle; a main engine carried by said vehicle and having a power output capacity sufficient to propel said vehicle under normal driving conditions; drive means including a transmission having four forward speeds drivingly connecting said main engine with said said rear axle; an auxiliary engine having a power output capacity consistent with the normal power absorbing tractive capacity of the vehicle front wheels also carried by said vehicle; and drive means independent of said main engine drive means operative to drivingly connect said auxiliary engine with said front axle, said auxiliary engine drive means having only three speeds corresponding to the second, third and fourth forward speeds of said main engine transmission to further avoid undue load and strains on the mechanism of said front drive steering axle.

3. In a dual engine vehicle, a rear two speed drive axle driven by one of said engines, a front steer drive axle driven by the other of said engines, and control means selectively operable to power said vehicle only by said one engine driving said two speed axle at its higher speed, only by said one engine driving said two speed axle at its lower speed, or by both of said engines driving their associated axles with said one engine driving the two speed axle at its lower speed.

4. In a vehicle, a multi-speed drive rear axle, an engine connected to drive said axle, a front steer drive axle, a second engine connected to drive said front axle, means operable to selectively shift the gear ratio of said multi-speed axle; and means having an interlock with said first mentioned means operative to control operation of said second engine.

5. In a vehicle, a two speed drive axle; means for selecting the drive speed of said axle; a second drive axle having a single drive speed corresponding to the lower speed of said two speed drive axle; means for driving said axles simultaneously; and means disabling said single speed axle drive when the higher speed of said two speed axle is selected.

6. In a vehicle, a multi-speed drive axle, means for selecting the drive speed of said axle; a second drive axle having a single speed corresponding to one speed of said multi-speed drive axle; individual power plants for driving said axles; means controlling operation of said second drive axle and its associated power plant so as to drive said second axle only when said multi-speed axle is driven at said one speed; and means rendering said controlling means inoperative when said multi-speed axle is being driven at a speed different from that of said second drive axle.

7. In a vehicle, a two speed drive axle for normally driving the vehicle; means for selecting the drive speed of said axle; a single speed drive axle, having a drive speed corresponding to the lower speed of said two speed drive axle, for augmenting the two speed drive axle under predetermined abnormal driving conditions; means for independently driving said axles; and control means for starting the driving means for said single speed axle and selecting said lower speed of said two speed drive axle and subsequently connecting said single speed axle to its driving means.

8. In a vehicle, a two speed rear drive axle; a front steer drive axle having a speed ratio corresponding to the lower speed of said two speed drive axle; individual power plants operably associated with the respective axles; control means for selectively starting the power plant associated with said front axle and for coupling it thereto; and means responsive to operation of the power plant driving said two speed drive axle for rendering said controlling means so operative only when said multi-speed axle is being driven at its lower speed.

9. In a vehicle, a multi-speed rear drive axle having at least two drive gear ratios; a first engine drivingly connectable with said axle; manually controlled engine actuated means operatively associated with said axle for selecting any particular one of the available axle gear ratios for the drive connection; a front steer drive axle; a second engine drivingly connectable with said front axle; control means for rendering said second engine operative or inoperative to drive said front axle; and means operatively associated with said gear ratio selecting means and said control means operative upon the selection of a predetermined multi-speed axle gear ratio to render said control means effective to establish operativeness of said second engine to drive said front axle and operative at all other times to render said control means ineffective to establish said operativeness of said second engine.

10. A vehicle as defined in claim 9, including a clutch in said front axle; and means actuated by said second engine effective to engage said clutch when said engine is operating and disengage said clutch when said engine is not operating.

11. In a vehicle, a multi-speed drive axle having at least two drive gear ratios; a first engine drivingly connectable with said axle; manually controlled engine actuated means operatively associated with said axle for selecting any particular one of the available axle gear ratios for the drive connection; a single speed axle; a second engine drivingly connectable with said single speed axle; control means for rendering said second engine operative or inoperative to drive said single speed axle; and means operatively associated with said second engine having an effectiveness conditioned on the operation of said first engine and the selection of a predetermined multi-speed axle gear ratio to render said second control means operative to establish operativeness of said second engine to drive said single speed axle.

12. In a vehicle, a multi-speed drive axle having at least two drive gear ratios; a first engine drivingly connectable with said axle; manually controlled engine actuated means operatively associated with said axle for selecting any particular one of the available axle gear ratios for said driving connection; a single speed drive axle; a second engine drivingly connectable with said single speed axle; means operatively associated with said single speed axle actuated by said second engine to establish a driving connection between said second engine and said single speed axle; and means operable upon the selection of a predetermined multi-speed axle gear ratio to render said second engine effective to actuate said drive establishing means.

13. In a heavy duty vehicle having a rear drive axle arrangement and a front steer drive axle; a main engine having a power output capacity sufficient to propel the vehicle under normal driving conditions drivingly connected with said rear axle arrangement; an auxiliary engine having a power output capacity based on the load carried by said front axle and less than said main engine power output capacity connectable with said front axle by means drivingly independent of said main axle drive; a multi-speed drive gear mechanism in said rear axle having two drive ratios and said front axle comprising a gear mechanism having a drive ratio corresponding to one of said two drive ratios; and means for controlling said engines and their respective drive connections to provide operation of said main engine alone or simultaneous operations of both engines, said means including shift mechanism for said rear axle; a manually operable control for said auxiliary engine; and an interlock between said shift mechanism and said manually operable control preventing operation of said auxiliary engine except when said rear axle is driven through its gear ratio corresponding to said front axle ratio.

14. In a heavy duty vehicle having a rear drive axle and a front steering drive axle; a main engine drivingly connected with said rear axle; an auxiliary engine smaller than said main engine for supplementing the power thereof drivingly connectable with said front axle by drive mechanism independent of said main engine drive; said front axle including a double reduction drive gear, and said rear axle being provided with a two speed double reduction drive gear to provide additional gear ratios for said main engine drive; means for selecting the drive speed of said rear axle, and means controlled by said selecting means for establishing a drive connection between said auxiliary engine and said front axle only when said rear axle is driven at its lower drive speed and when said auxiliary engine is operating.

15. In a vehicle, a two speed rear axle and means for selecting its drive speed ratio, a front drive axle, a clutch in said front axle, individual engines connected to drive the respective axles, actuator means normally maintaining said clutch disengaged, means controlled by said selecting means for starting operation of said engine for driving the front axle only when said rear axle is driven at its lower speed ratio, and means operable only when said engine for driving the front axle is operating for energizing said actuator to engage said clutch.

16. In a vehicle, a chassis; a multi-speed rear drive axle having speed ratio selector means and a front steer drive axle connected to said chassis; shiftable clutch means in said front drive axle; individual power means for driving said axles; starting means for said power means driving the front axle controlled by said speed ratio selector means; and means for actuating said clutch means operative to permit engagement of said clutch means only when a predetermined speed ratio of said multi-speed drive axle is selected and the power means for driving said front axle is operating.

17. In a vehicle, a multi-speed drive axle having speed ratio selecting means, a second drive axle having a speed ratio corresponding to a speed ratio of said multi-speed axle, individual power plants connected to drive the respective axles, means controlling operation of said second drive axle and its associated power plant, and means rendering said controlling means operative to initiate operation of the power plant connected with said second drive axle only when said multi-speed axle is being driven at a speed ratio corresponding to said speed ratio of said second drive axle.

18. In a vehicle, a multi-speed rear axle, drive speed ratio selecting means for said axle, a main engine connected to drive said axle, a front drive axle having a speed ratio corresponding to a speed ratio of said rear axle, an auxiliary engine connected to drive said front axle, starting control means for said auxiliary engine, and means responsive to operation of said main engine and gear ratio selection of said multi-speed rear axle controlling operation of said starting control means to permit starting of said auxiliary engine only upon selection of a rear axle speed ratio corresponding to said front axle speed ratio.

19. In a vehicle, a multi-speed drive axle, drive speed ratio selecting means for said axle, a main engine connected to drive said axle, a second drive axle having a speed ratio corresponding to a speed ratio of said multi-speed axle, an auxiliary engine connected to drive said second axle, starting control means for said auxiliary engine, and manual control means for said second speed ratio selecting means operative to condition said starting control means to preclude starting of said auxiliary engine except upon selection of a speed ratio for said multi-speed axle corresponding to said speed ratio of said second axle.

20. In a vehicle having a multi-speed rear axle drive connected to a main engine and a steer drive front axle drive connected to an auxiliary engine, speed selector means for said multi-speed axle, at least two control switches for the ignition and starting circuits of said auxiliary engine, manual means for actuating said speed selector means for selecting the lower drive speed of said rear axle and simultaneously operating one of said switches, and means responsive to operation of said main engine for operating the other of said switches.

WALTER F. ROCKWELL.
BEVERLY W. KEESE.